J. V. McADAM.
RAILWAY CAR TRUCK.
APPLICATION FILED MAY 22, 1906.
900,759.
Patented Oct. 13, 1908.
2 SHEETS—SHEET 2.
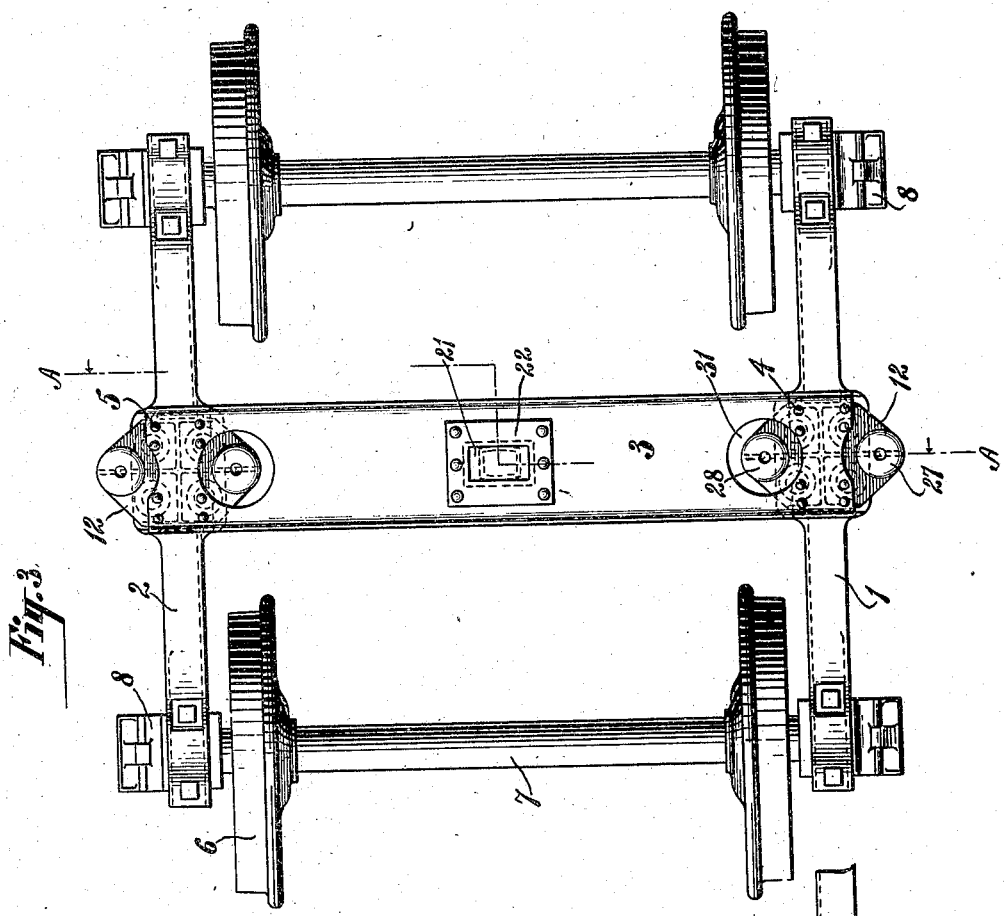
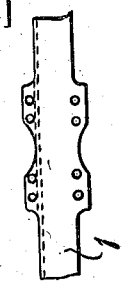
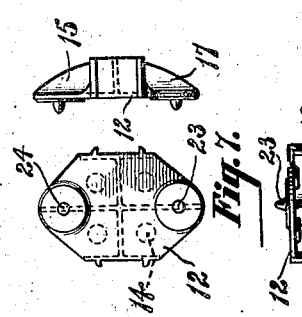
Witnesses:
F. G. Hachenberg
F. George Barry
Inventor:
John V. McAdam
by attorneys
Brown & Seward

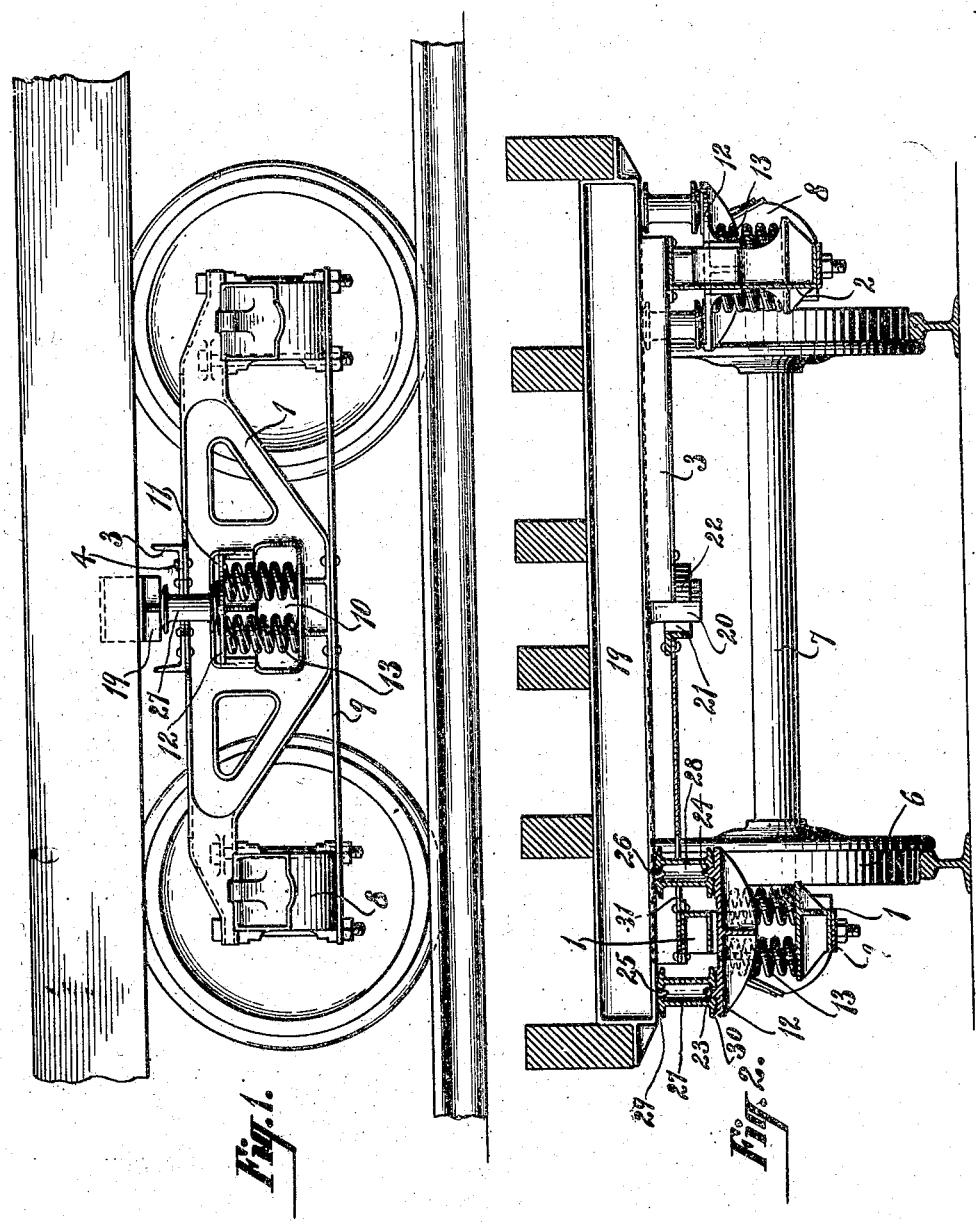

UNITED STATES PATENT OFFICE.

JOHN V. McADAM, OF NEW YORK, N. Y.

RAILWAY-CAR TRUCK.

No. 900,759.

Specification of Letters Patent.

Patented Oct. 13, 1908.

Application filed May 22, 1906. Serial No. 318,162.

*To all whom it may concern:*

Be it known that I, JOHN V. MCADAM, a citizen of the United States, and resident of the borough of Manhattan, in the city and State of New York, have invented a new and useful Improvement in Railway-Car Trucks, of which the following is a specification.

At present it is the usual practice in car construction to have the load of the car supported by the trucks at points between or off-set from the side frames. This construction requires the use of very heavy truck bolsters to properly transmit the load to the side frames and keep the side frames properly squared with respect to each other.

My invention consists in providing a structure in which the car load is supported upon the side frames independently of a truck bolster, the side frames of each pair being properly spaced apart by a cross connecting piece which receives none of the load of the car. This arrangement permits of a material reduction in the weight of the truck and also in the cost of manufacturing the same.

My invention consists further in providing certain improvements in the construction, form and arrangement of the several parts of a truck of this character having cast side frames; rocker bearings being interposed between the body of the car and the truck, which rocker bearings receive the entire weight of the car, and transmit it to the truck.

In the accompanying drawings, Figure 1 represents the truck in side elevation, a portion of the car and the track also being shown, Fig. 2 is a transverse vertical section taken in the plane of the line A—A of Fig. 3, looking in the direction of the arrows, Fig. 3 is a top plan view of the truck, the rocker bearings being shown in position thereof, Fig. 4 is a detail top view of one of the side frames, and Figs. 5, 6 and 7 are detail top, side and end views of one of the spring caps.

The truck shown herein has cast side frames 1 and 2 of the desired shape to produce the strength required, which side frames are spaced apart by a cross connecting piece 3 which is riveted at 4 and 5 to the top of the frames 1 and 2, respectively.

The wheels of the truck are denoted by 6, the axle 7 of each pair being mounted in journal bearings in the usual journal boxes 8 carried by the side frames of the truck. A tie bar 9 connects the bottoms of the journal boxes 8 on one side of the truck to the bottom of the side frame, as is usual. Each of the truck frames 1 and 2 has a transverse opening 10 therethrough, the upper portion 11 of which is preferably contracted. A spring cap 12 is fitted to slide vertically in the contracted portion 11 of the transverse opening 10, which spring cap may be inserted or removed laterally by bringing it down into the larger portion of the said opening 10. Coil springs 13 are interposed between the spring cap 12 and the side frame. In the present instance the bottom of the transverse opening 10 forms a spring seat. In the form shown herein, four of these springs 13 are provided for each spring cap, which springs are confined within the cap by providing lugs 14 and partitions 15, 16, 17 and 18 on the bottom of said cap.

The body bolster of the car is denoted by 19, which body bolster may be provided with the usual depending thimble 20, which projects downwardly through a transversely elongated hole 21 in the cross connecting piece 3 for preventing a too great movement of the body with respect to the truck in every direction. The connecting piece 3 may be provided with a collar 22 surrounding the thimble 20 for additional strength at this point if so desired.

Rocker bearings are interposed between the body bolster 19 and each of the spring caps 12 for transmitting the weight of the car to the side frames independently of a truck bolster as distinguished from applying the weight of the car onto a truck bolster between the said frames as is now common. These rocker bearings, in the present instance, are constructed and arranged as follows:—Each cap 12 is provided with two teats or lugs 23, 24, uprising therefrom outside and inside of the side frame. The body bolster 19 is provided with depending teats or lugs 25, 26, opposite to the lugs 23, 24, on the spring cap. Rocker bearing pieces 27, 28, are interposed between the body bolster 19 and the spring cap 12, the piece 27 being held in position by the lugs 23, 25, and the piece 28 being held in position by the lugs 24, 26. The top and bottom of each of these pieces may be of spherical form, as shown at 29, 30, and the engagement of these pieces with their lugs is such that the body bolster 19 of the car may have a limited movement in any direction, the tops and bottoms of the pieces 27, 28, serving as a rocking bearing between each spring cap 12 and the body bolster. Holes 31 are formed through the cross connecting piece 3 through which the inner rocker bearing pieces 24 extend.

From the construction herein set forth it will be seen that the use of a truck bolster is obviated as the load of the car is supported by the side frames through the springs 13, spring caps 12 and rocker bearings. It is to be understood that these rocker bearings may be made in various shapes and sizes to suit different requirements. It is also to be understood that the form of the side frames and connecting piece may be varied from that shown and described herein without departing from the spirit and scope of my invention and that various other changes might be made; hence I do not wish to limit myself strictly to the construction herein set forth, but

What I claim is:—

1. The combination with the side frames of a railway car truck, of a car body and rocker bearings having a limited rocking movement in all directions, interposed between the car body and the truck for supporting the car load symmetrically over the side frames independently of a truck bolster.

2. The combination with the cast side frames of a railway car truck, of a car body and rocker bearings having a limited rocking movement in all directions, interposed between the car body and the truck for supporting the car load symmetrically over the side frames independently of a truck bolster.

3. The combination with the side frames of a railway car truck, of a car body bolster and rocker bearings having a limited rocking movement in all directions, interposed between the car body bolster and the truck for supporting the car load symmetrically over the side frames independently of a truck bolster.

4. The combination with the cast side frames of a railway car truck, of a car body bolster and rocker bearings having a limited rocking movement in all directions, interposed between the car body bolster and the truck for supporting the car load symmetrically over the side frames independently of a truck bolster.

5. The combination with the side frames of a railway car truck, of a car body, springs seated in the side frames, spring caps and rocker bearings having a limited rocking movement in all directions, interposed between the spring caps and the car body for supporting the car load symmetrically over the side frames independently of a truck bolster.

6. The combination with the cast side frames of a railway car truck, of a car body, springs seated in the side frames, spring caps and rocker bearings having a limited rocking movement in all directions, interposed between the spring caps and the car body for supporting the car load symmetrically over the side frames independently of a truck bolster.

7. The combination with the side frames of a railway car truck, of a car body bolster, springs seated in the side frames, spring caps and rocker bearings having a limited rocking movement in all directions, interposed between the spring caps and the car body bolster for supporting the car load symmetrically over the side frames independently of a truck bolster.

8. The combination with the cast side frames of a railway car truck, of a car body bolster, springs seated in the side frames, spring caps and rocker bearings having a limited rocking movement in all directions, interposed between the spring caps and the car body bolster for supporting the car load symmetrically over the side frames independently of a truck bolster.

9. The combination with the side frames of a railway car truck, said side frames having transverse openings therethrough, of a car body, and spring caps fitted to slide in said openings, springs interposed between the caps and the side frames and rocker bearings interposed between the spring caps and the car body.

10. The combination with the cast side frames of a railway car truck, said side frames having transverse openings therethrough, of a car body, spring caps fitted to slide in said openings, springs interposed between the caps and the side frames and rocker bearings interposed between the spring caps and the car body.

11. The combination with the side frames of a railway car truck, said side frames having transverse openings therethrough, of a car body bolster, spring caps fitted to slide in said openings, springs interposed between the caps and the side frames and rocker bearings interposed between the spring caps and the body bolster.

12. The combination with the cast side frames of a railway car truck, said side frames having transverse openings therethrough, of a car body bolster, spring caps fitted to slide in said openings, springs interposed between the caps and the side frames and rocker bearings interposed between the spring caps and the body bolster.

13. The combination with the side frames of a railway car truck, said side frames having transverse openings therethrough provided with upper contracted portions, of a car body, spring caps fitted to slide in the contracted portions of the transverse openings, springs interposed between the caps and the side frames and rocker bearings interposed between the spring caps and the car body.

14. The combination with the cast side frames of a railway car truck, said cast side frames having transverse openings therethrough provided with upper contracted portions, of a car body, spring caps fitted to slide in the contracted portions of the transverse openings, springs interposed between the caps and the side frames and rocker bearings interposed between the spring caps and the car body.

15. The combination with the side frames of a railway car truck, said side frames having transverse openings therethrough provided with upper contracted portions, of a car body bolster, spring caps fitted to slide in the contracted portions of the transverse openings, springs interposed between the caps and the side frames and rocker bearings interposed between the spring caps and the body bolster.

16. The combination with the cast side frames of a railway car truck, said side frames having transverse openings therethrough provided with upper contracted portions, of a car body bolster, spring caps fitted to slide in the contracted portions of the transverse openings, springs interposed between the caps and the side frames and rocker bearings interposed between the spring caps and the body bolster.

17. The combination with the side frames of a railway car truck, said side frames having transverse openings therethrough, of a car body, a spring cap fitted to slide in each of said transverse openings and projecting upon both sides of the side frame, springs interposed between the spring cap and side frame and rocker bearing pieces upon both sides of the side frame interposed between the spring cap and the car body.

18. The combination with the cast side frames of a railway car truck, said cast side frames having transverse openings therethrough, of a car body, a spring cap fitted to slide in each of said transverse openings and projecting upon both sides of the side frame, springs interposed between the spring cap and side frame and rocker bearing pieces upon both sides of the side frame interposed between the spring cap and the car body.

19. The combination with the side frames of a railway car truck, said side frames having transverse openings therethrough, of a car body bolster, a spring cap fitted to slide in each of said transverse openings and projecting upon both sides of the side frame, springs interposed between the spring cap and side frame and rocker bearing pieces upon both sides of the side frame interposed between the spring cap and the body bolster.

20. The combination with the cast side frames of a railway car truck, said side frames having transverse openings therethrough, of a car body bolster, a spring cap fitted to slide in each of said transverse openings and projecting upon both sides of the side frame, springs interposed between the spring cap and side frame and rocker bearing pieces upon both sides of the side frame interposed between the spring cap and the body bolster.

In testimony, that I claim the foregoing as my invention, I have signed my name in presence of two witnesses, this 15th day of May 1906.

JOHN V. McADAM.

Witnesses:
FREDK. HAYNES
HENRY THIEME.